(No Model.)

J. W. PERKINS.
MECHANICAL TOY.

No. 255,886.  Patented Apr. 4, 1882.

Witnesses.
W. H. Marsh
Charles L. Burdett

Inventor.
Joel W. Perkins
By W. E. Simonds,
Atty

UNITED STATES PATENT OFFICE.

JOEL W. PERKINS, OF EAST HAMPTON, CONNECTICUT.

MECHANICAL TOY.

SPECIFICATION forming part of Letters Patent No. 255,886, dated April 4, 1882.

Application filed February 16, 1882. (No model.)

To all whom it may concern:

Be it known that I, JOEL W. PERKINS, of East Hampton, in the county of Middlesex and State of Connecticut, have invented a certain new and useful Improvement in Mechanical Toys, of which the following is a description, reference being had to the accompanying drawings, where—

Figure 1:
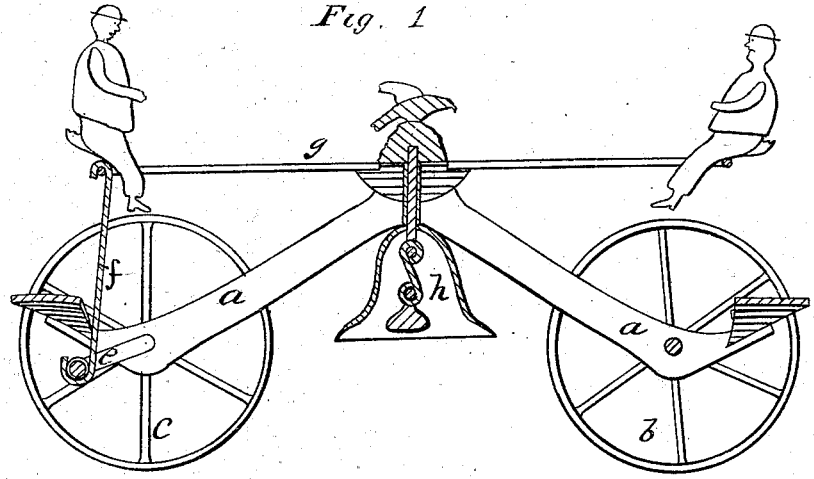
Figure 2:
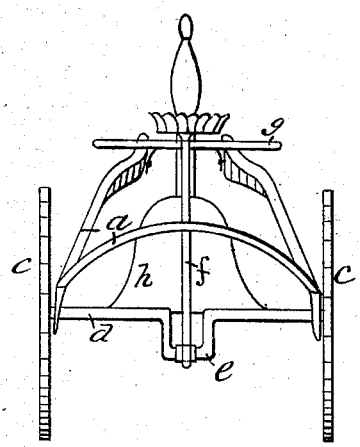

Figure 1 is a view in longitudinal vertical section of my device. Fig. 2 is a view of one end of same.

My improvement relates to that class of toys mounted on wheels in which the motion of the whole device is utilized by certain well-known means—as crank and pitman—to convey motion to figures variously arranged upon the frame.

It consists of a frame mounted on wheels, one pair, at least, rigidly attached to the axle, which is formed into a crank, and so connected with a seesaw pivotally attached to the frame as to vertically oscillate the seesaw and ring a bell.

In the accompanying drawings, the letter $a$ denotes a frame, preferably of cast metal, as iron; $b\,b$, the front wheels; $c\,c$, the rear wheels, rigidly attached to axle $d$, which is formed at about its center into a crank, $e$. To this crank a pitman, $f$, connects one end of a seesaw, $g$, pivoted to the frame at about its center, and which bears a bell, $h$, of ordinary form, so secured to the seesaw that the oscillations of the latter cause the bell to ring.

By a cord attached to the device it is wheeled about and the revolutions of the wheels converted into the oscillations of the seesaw, which bears appropriate figures—as of a boy—and by the swinging of the bell causes the tongue to ring it.

I claim as my invention—

1. In a mechanical toy, a seesaw bearing a bell and pivoted to a wheeled frame, and attached to the axle by intermediate mechanism, whereby the revolutions of the wheel and axle operate the device, all substantially as described.

2. In a mechanical toy, in combination, a frame, $a$, wheels $b$ and $c$, axle $d$, crank $e$, pitman $f$, seesaw $g$, and bell $h$, all substantially as described.

JOEL W. PERKINS.

Witnesses:
AUGUSTUS H. CONKLIN,
CLARK WATROUS.